United States Patent [19]

Takada

[11] Patent Number: 4,529,926
[45] Date of Patent: Jul. 16, 1985

[54] POWER FACTOR REGULATING METHOD FOR CONNECTION OF A CAPACITOR TO A LINE AND APPARATUS EMBODYING THE METHOD

[75] Inventor: Shigetoshi Takada, Himeji, Japan

[73] Assignee: Kabushiki Kaisha Shinwa Giken, Himeji, Japan

[21] Appl. No.: 452,903

[22] Filed: Dec. 27, 1982

[30] Foreign Application Priority Data

Sep. 27, 1982 [JP] Japan .................................. 57-169095

[51] Int. Cl.³ .............................................. H02J 3/18
[52] U.S. Cl. ..................................... 323/210; 323/209
[58] Field of Search ................................ 323/205–211; 307/86

[56] References Cited

U.S. PATENT DOCUMENTS

| 3,703,680 | 11/1972 | Frank et al. | 323/210 |
| 3,731,183 | 5/1973 | Johnson et al. | 323/210 |
| 4,139,723 | 2/1979 | Havas | 323/210 |
| 4,162,442 | 7/1979 | Frank | 323/210 |

FOREIGN PATENT DOCUMENTS 2303939 7/1974 Fed. Rep. of Germany ...... 323/210

OTHER PUBLICATIONS

Frank et al., "Fast Thyristor Control of Our Power Network" (English translation), Eltek. Aktuell Elektron. (Sweden), vol. 22, No. 3, pp. 44–46, Feb. 1979.

Primary Examiner—William H. Beha, Jr.
Attorney, Agent, or Firm—Lowe King Price & Becker

[57] ABSTRACT

Power factor regulating method and an apparatus embodying the method in which each of three condensers, which are to be connected to each phase of a three phase distribution line, is preliminarily charged with approximately peak line voltage while a load connected to a distribution line is opened in order to lessen impulse waves that are brought about at the time of connection of the condenser to the appropriate phase of the power line. The present method needs no conventional discharging coil.

8 Claims, 11 Drawing Figures

POWER FACTOR REGULATING METHOD FOR CONNECTION OF A CAPACITOR TO A LINE AND APPARATUS EMBODYING THE METHOD

FIELD OF THE INVENTION

This invention relates to a power-factor regulating method and an apparatus embodying the method, especially to said method and said apparatus which are capable of killing impulse waves brought about at the time condensers are connected to the power lines and of eliminating discharging coils.

BACKGROUND OF THE INVENTION

The conventional power-factor regulating apparatus for three phase circuit is composed of delta-connected condensers $1a'1b'1c'$, series reactors $2a'2b'2c'$, and V-connected discharging coils $3a\ 3b$ shown in FIG. 1.

The apparatus is connected to a distribution line through a switch 4 sychronized with a switch 4' for connecting a load L to the distribution line.

Said discharging coils $3a\ 3b$ are provided for the purpose of discharging the condensers $1a'1b'1c'$ within a predetermined time while said load is disconnected from the line in order to absorb impulse waves which might arise in the circuit caused by differences between line voltages and electric charge remaining on the condensers. However, the coils can't absorb said impulse waves completely.

It is incidentally noted that devices or apparatuses which produce impulsive noise sometimes generate in nearby computers harmful effects such as transformation of content of memories with the impulsive noises despite provision of discharging coils. Such harmful effects are particularly serious for important memories such as financial data.

Furthermore, the operating term of said discharging coils, from approximately a few seconds to a few minutes, is too long in the case where rapid switching is needed, when the coils overwork and destroy themselves because of the rapid switching synchronized with the switching for said load.

SUMMARY OF THE INVENTION

In the light of the above conventional problem, this invention is proposed. A feature of this invention is to charge each of three condensers which are to be connected to each phase of a three phase distribution line preliminarily with approximately peak line voltage while a load connected to a distribution line is disconnected therefrom and to connect said condenser to the line at the time line voltage is at or around its maximum after the load is connected.

The main object of this invention is to lessen impulse waves to the level providing no harmful effects on any electrical apparatus such as a computer.

A second object is to eliminate conventional discharging coils and power loss caused by the discharging of the condensers.

These and other objects of this invention will become more apparent in the detailed description and examples which follow.

FIG. $3a$–$3e$ are timing charts of the wave forms of line votlage, condenser voltage, condenser current, thyristor voltage, and gate voltage of the thyristor, which are present in the circuit of this invention.

FIGS. $4a$–$b$ are graphs of the wave forms for explaining the action of the reactors.

Figure 5:
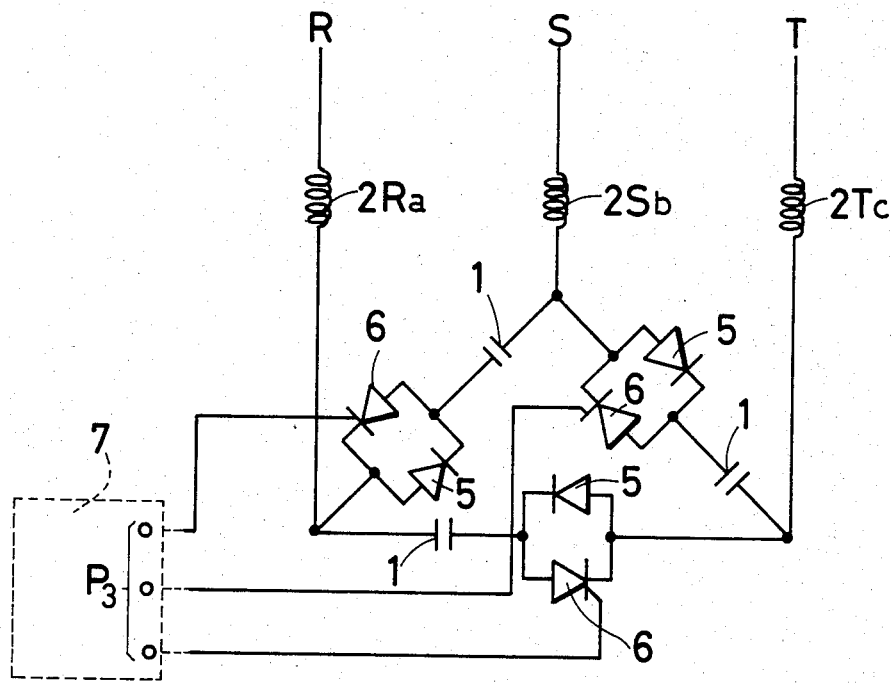

FIG. 5 is a view of another embodiment of the invention.

Figure 6:
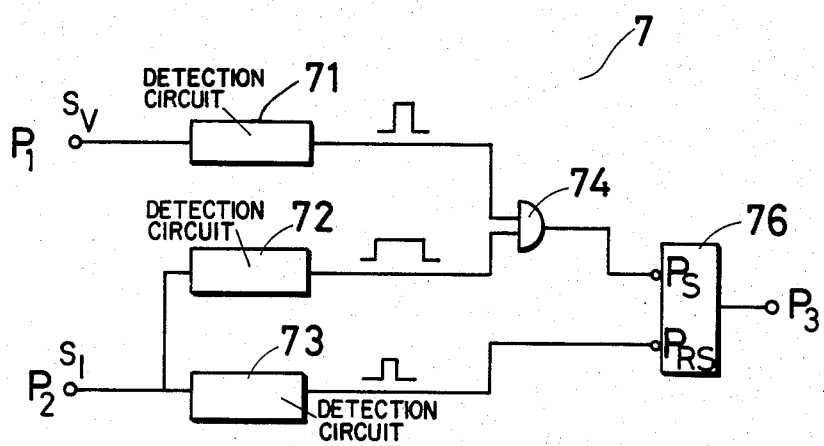

FIG. 6 is a view of a switching control unit for the thyristors.

DETAILED DESCRIPTION OF THE INVENTION

Figure 1:
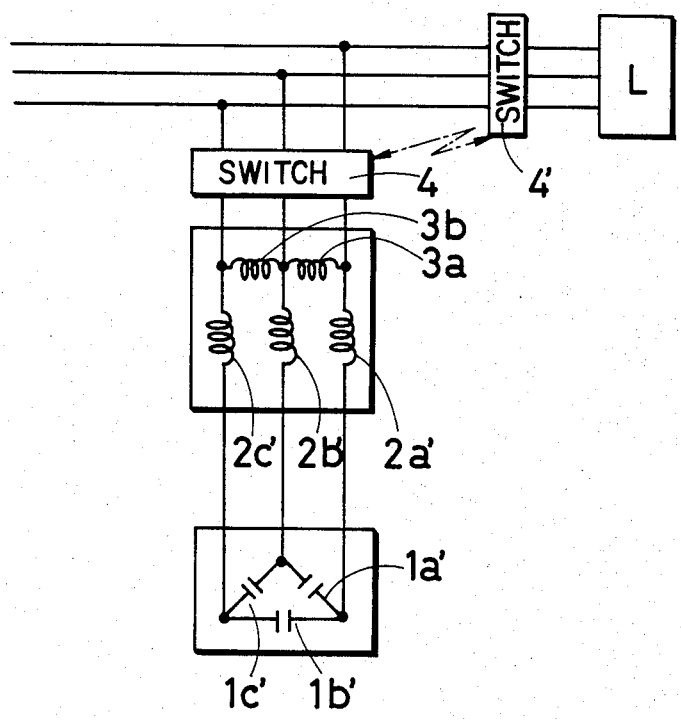
FIG. 1 is a view of a conventional apparatus for regulating power-factor.
Figure 2:
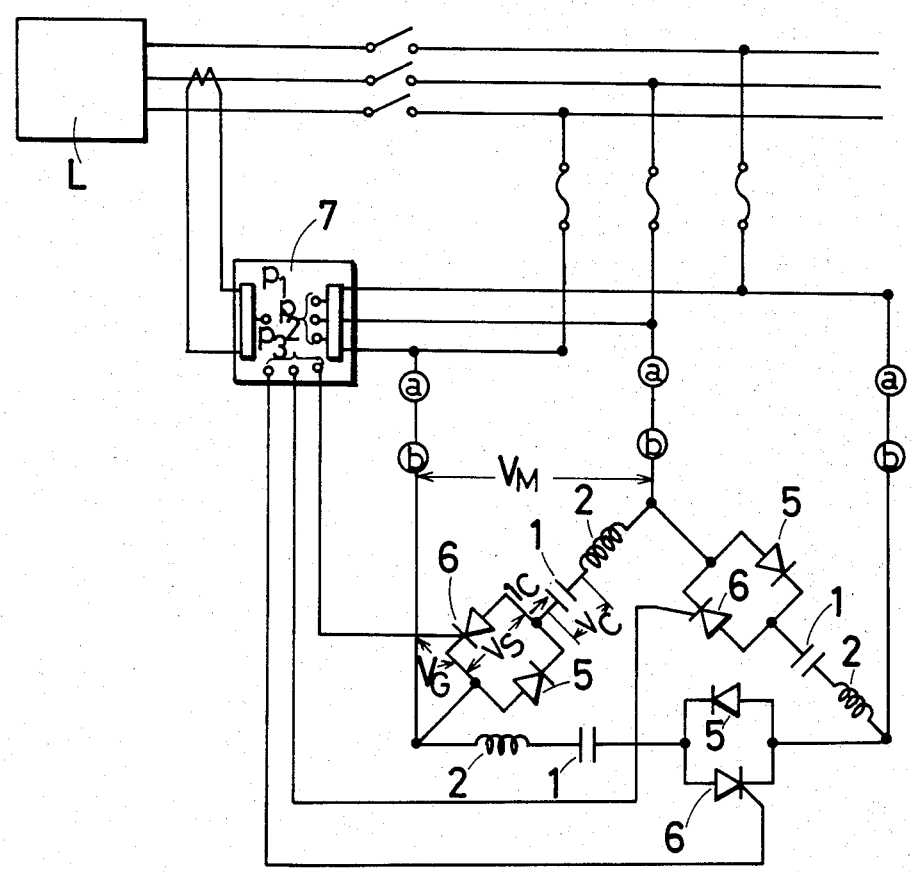
FIG. 2 is a view of an embodiment of the present invention for regulating power-factor.

FIG. 2 is an embodiment of this invention, which is connected to a distribution line under the control of a switching control unit 7.

In FIG. 2, a delta-connected circuit consists of three series circuits, each of which is composed of a diode 5 and a thyristor 6 connected in parallel, at which the polarities of said diode and said thyristor are reversed, a condenser 1 and a reactor 2.

The following is mentioned on the operation of one phase of the illustrated three phase circuit.

Figure 3:
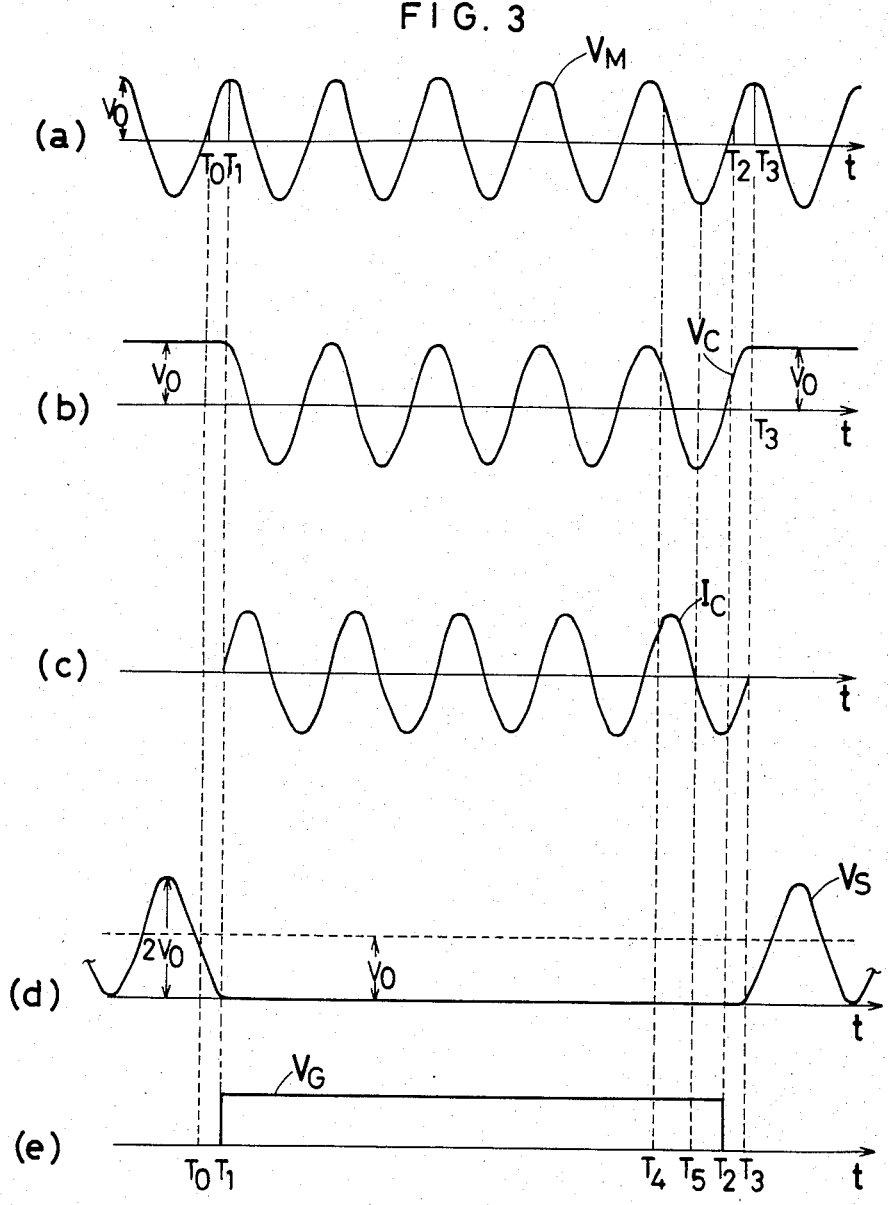

In said circuit, the thyristor 6 is controlled by the switching control unit 7 in synchronism with switching of a load connected to the distribution line. FIG. 3 is the timing chart of several wave forms composed in said circuit under the control of the switching control unit 7.

In FIG. 3 there is shown the wave form of line voltage $V_M$, (b) is the wave form of condenser voltage $V_C$, (c) is the wave form of condenser current $I_C$, (d) is the wave form of thyristor voltage $V_S$, and (e) is the wave form of gate voltage $V_G$ of the thyristor 6.

At the time $T_0$, the time of connection of the load to the distribution line, setting the thyristor 6 on means that the condenser 1 operates as a power factor regulator, and this timing is an important factor in this invention.

Prior to connection to the line, the condenser 1 is charged with approximately peak line voltage $V_0$ through the diode 5 while the thyristor 6 is cut off whether the load is opened or closed as is indicated in FIG. $3b$.

Therefore, in order to eliminate impulse waves, setting the thyristor 6 on at the time line voltage $V_M$ is at or around its maximum (the best condition is at its maximum) is the suitable timing for connecting the condenser 1, and this time is the time shown at $T_1$ in FIG. 3.

So at the time $T_1$, the switching control unit 7 impresses voltage $V_G$ at the gate of the thyristor 6 to set the thyristor 6 on as is indicated in FIG. $3e$. In this case, the wave form of gate voltage $V_G$ is not a typical wave form (pulse wave) of a thyristor but a direct current which arises at the time $T_1$ and terminates at the time $T_2$.

Since the thyristor 6 is on while line voltage $V_M$ is below condenser voltage $V_C$ while, to the contrary, diode 5 is on while line voltage $V_M$ is above condenser voltage $V_C$, said thyristor or said diode are seen to be on one after another, as a result causing the condenser voltage $V_C$ and condenser current $I_C$ to be as is indicated in FIGS. $3b$–$c$.

At the time $T_2$, the load is removed from the distribution line and gate voltage $V_G$ of the thyristor 6 is cut off, charging of the condenser is begun through the diode 5 until time $T_3$, when the line voltage is at its maximum and condenser current $I_C$ is zero. The diode 5 keeps the condenser 1 at line voltage while the load is removed, because the diode supplies leakage current to the condenser 1 every half cycle of line voltage. Even though gate voltage $V_G$ of the thyristor 6 may be cut off at time $T_4$, the thyristor 6 is on, from time $T_4$ to time $T_5$ and the diode 5 is on, from time $T_5$ to time $T_3$, therefore, the same result is presented.

It is incidentally noted that the reactor 2 is provided in place of conventional series reactor 2', and it is confirmed that the reactor 2 operates well as a wave reformer. One evidence of that is indicated in FIGS. 4a–b, the wave form of current between a and b, based alternatively on a configuration of the circuit of this invention which doesn't have the reactor 2 (FIG. 4a), and on a configuration of the circuit of this invention which includes the reactor 2 (FIG. 4b).

Figure 4:
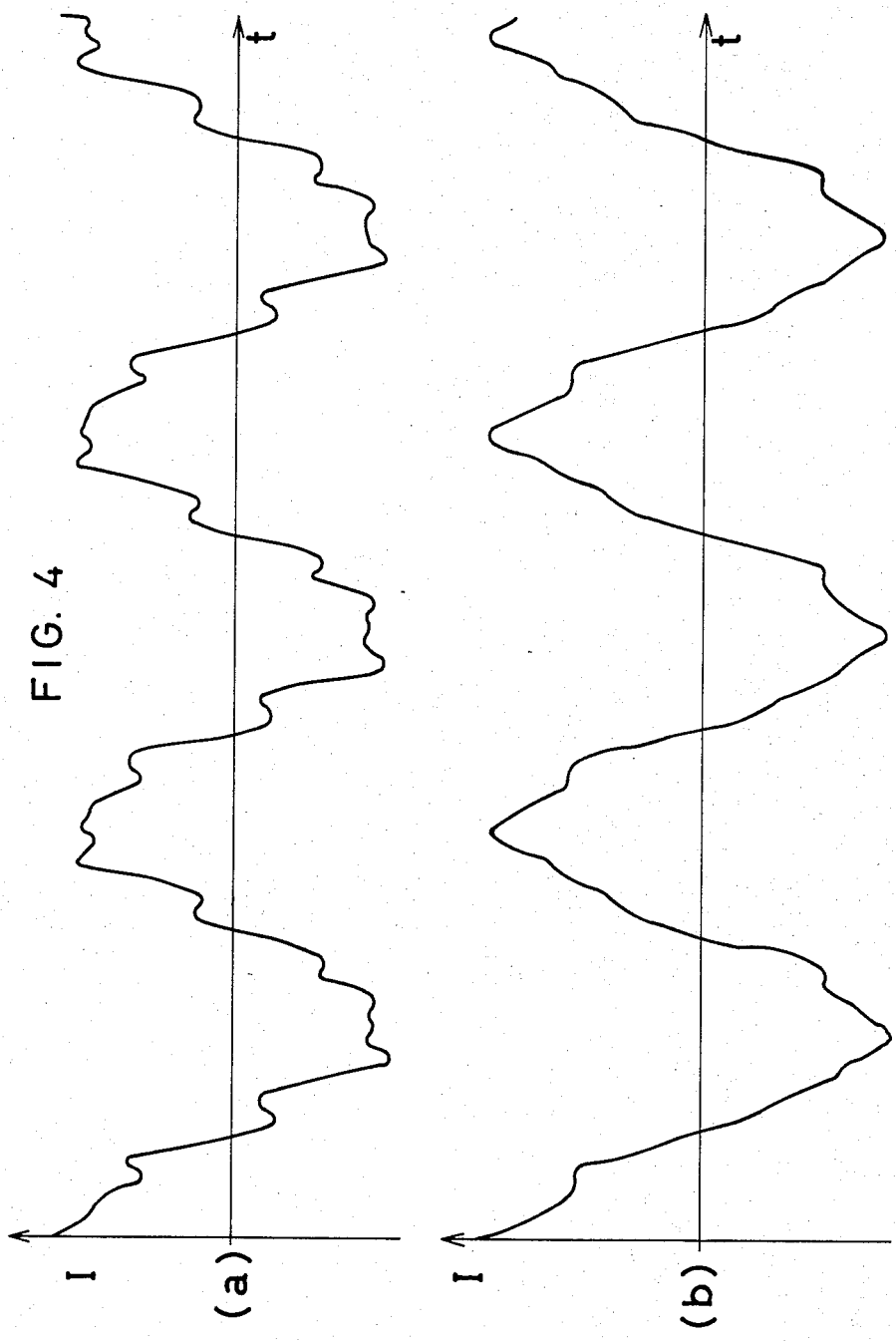

FIGS. 4a–b indicate the apparent effect of the reactor 2 in FIG. 2. Further, the reactor 2 is permitted to have about half capacity of a conventional reactor, therefore, the reactor 2 advantageously has smaller volume and lower manufacturing cost.

Of course, the conventional way of connecting the reactors 2Ra 2Sb 2Tc indicated in FIG. 5 is also effective if the above advantages are ignored.

For reference, a brief explanation of a switching control unit 7 embodying this invention is provided as follows.

FIG. 6 is an example of a switching control unit for one phase. In FIG. 6 a signal corresponding to line voltage is inputted to terminal $P_1$, a signal corresponding to load current is inputted to terminal $P_2$ and gate voltage of the thyristor is outputted from terminal $P_3$. Voltage signal SV from the terminal $P_1$ is inputted to an and-gate 74 through a detection circuit 71 which produces a pulse wave at the time line voltage is at its maximum, while current signal $S_I$ is inputted to the and-gate 74 through a detection circuit 72 which produces a pulse wave at the time the load is connected, and and-gate 74 outputs a signal to a set terminal $P_S$ of a set-reset circuit 76. On the other hand, the signal from terminal $P_2$ is inputted to a reset terminal $P_{RS}$ of the set-reset circuit 76 through a detection circuit 73 which produces a pulse wave when the load is disconnected.

In said unit, the set-reset circuit 76 is to be set at the time the line voltage is at its maximum after the load is connected to the distribution line, and the set-reset circuit 76 is to be reset when the load is disconnected, thus the set-reset circuit produces voltage $V_G$ for the gate of the thyristor at a terminal $P_3$.

As is stated above, the apparatus using the method of this invention which is capable of connecting a condenser which is previously charged with approximately peak line voltage at the time line voltage is at its maximum in order to lessen impulse waves at the time the load is connected, is the most suitable power-factor regulator for buildings which possess delicate electrical apparatus such as computers.

Furthermore, the apparatus of this invention can shorten the term of charging the condenser with the use of a high-fidelity switching control unit, therefore this apparatus can be used under a rapid switching condition.

Additionally, said apparatus can save power loss caused by discharging, for the reason it has no discharging coil, and the reactor of this invention, which is connected to the distribution line in parallel, has an effect similar to that of a conventional series reactor. Moreover, the reactor of this invention is permitted to have about half the capacity of that of a conventional series reactor.

I claim:

1. Power-factor regulating apparatus comprising:
   a delta connected circuit which comprises three series circuits, each of the series circuits connected in parallel with a phase of a distribution line and including:
   a parallel circuit composed of a diode and a thyristor connected in parallel, at which the polarities of said diode and said thyristor are reversed, a condenser, and a reactor as wave reformer, connected in series, and
   control means for preliminarily charging said condenser to about maximal line voltage while a load is disconnected from said distribution line and thereafter for connecting said condenser to said distribution line by operation of said thyristor at the time the line voltage is at or around its maximum after said load is connected to said distribution line,
   wherein said control means includes gate signal generating means for providing a substantially constant signal voltage to a gate of said thyristor beginning at said time when the line voltage is at or around its maximum after said load is connected to said distribution line and terminating at a time when said load is disconnected from said distribution line.

2. Power factor regulating apparatus as recited in claim 1 wherein said control means further includes means for terminating connection of said condenser to said distribution line upon detection of a first line voltage maximum subsequent to disconnection of said load from said distribution line and for maintaining current flow in said condenser until detection of said first line voltage maximum subsequent to disconnection of said load from said distribution line.

3. Power factor regulating apparatus as recited in claim 1 wherein said gate signal generating means includes first detecting means for detecting presence of a maximum value of said line voltage and for generating a first signal indicative thereof and second detecting means for detecting connection of said load to said distribution line and for generating a second signal indicative thereof,
   together with means responsive to said first and second signals generated by said first and second detecting means for causing generation of said gate signal when said line voltage reaches said maximum value thereof after connection of said load to said distribution line.

4. Power factor regulating apparatus as recited in claim 3 wherein said means responsive to said first and second signals comprises AND gate means.

5. Power factor regulating apparatus as recited in claim 3 wherein said gate signal generating means further includes third detecting means for detecting removal of said load from said distribution line and for producing a third signal indicative thereof,
   together with means responsive to said third signal for terminating said gate signal upon detection of removal of said load from said distribution line.

6. Power factor regulating apparatus as recited in claim 5 wherein said means responsive to said first and second signals and said means responsive to said third signal together comprise set-reset means in said gate signal generating means and connected to be set by said means responsive to said first and second signals and connected to be reset by said third means for producing said gate signal.

7. A power-factor regulating apparatus comprising:
a delta connected circuit which includes three series circuits, each of said series circuits including a condenser connected in series with a circuit composed of a diode and thyristor connected in parallel, at which the polarities of said diode and said thyristor are reversed, connected in series and three series reactors which are respectively connected between a respective phase of said delta connected circuit and the distribution line, control means for preliminarily charging said condenser to about maximal line voltage while a load is disconnected from said distribution line and thereafter for connecting said condenser to said distribution line by operation of said thyristor at the time the line voltage is at or around its maximum after said load is connected to said distribution line, wherein said control means includes gate signal generating means for providing a substantially constant signal voltage to a gate of said thyristor beginning at said time when the line voltage is at or around its maximum after said load is connected to said distribution line and terminating at a time when said load is disconnected from said distribution line, said control means further including means for terminating connection of said condenser to said distribution line upon detection of a first line voltage maximum subsequent to disconnection of said load from said distribution line and for maintaining current flow in said condenser until detection of said first line voltage maximum subsequent to disconnection of said load from said distribution line.

8. Power-factor regulating method comprising the steps of:
charging a condenser to approximately peak line voltage of a power line during a time when a load is not connected to the power line, detecting connection and disconnection of the load to and from the power line, generating signals indicative of connection and disconnection of the load to and from the power line, detecting peaks in the power line voltage, generating signals indicative of occurrence of said voltage peaks on said power line, after detecting connection of the load to the power line, providing a constant gate voltage to activate a thyristor for connecting the condenser to the power line in response to a signal indicative of occurrence of the first subsequent voltage peak on said power line, terminating said constant gate voltage at an arbitrary time as a function of disconnection of the load from the power line, after detecting disconnection of the load from the power line, charging the condenser until the first subsequent peak voltage is detected on the power line, and thereafter providing charge onto said condenser and maintaining the condenser fully charged at approximately said peak line voltage until detection of a next connection of said load to said power line.

* * * * *